United States Patent [19]

Hellman et al.

[11] 4,200,770
[45] Apr. 29, 1980

[54] CRYPTOGRAPHIC APPARATUS AND METHOD

[75] Inventors: Martin E. Hellman, Stanford; Bailey W. Diffie, Berkeley; Ralph C. Merkle, Palo Alto, all of Calif.

[73] Assignee: Stanford University, Palo Alto, Calif.

[21] Appl. No.: 830,754

[22] Filed: Sep. 6, 1977

[51] Int. Cl.² .............................................. H04L 9/04
[52] U.S. Cl. ................................ 178/22; 340/149 R; 375/2; 455/26
[58] Field of Search ........................ 178/22; 340/149 R

[56] References Cited

PUBLICATIONS

"New Directions in Cryptography", Diffie et al., *IEEE Transactions on Information Theory*, vol. IT-22, No. 6, Nov. 1976.

Diffie & Hellman, Multi-User Cryptographic Techniques", *AFIPS Conference Proceedings*, vol. 45, pp. 109-112, Jun. 8, 1976.

*Primary Examiner*—Howard A. Birmiel
*Attorney, Agent, or Firm*—Flehr, Hohbach, Test

[57] ABSTRACT

A cryptographic system transmits a computationally secure cryptogram over an insecure communication channel without prearrangement of a cipher key. A secure cipher key is generated by the conversers from transformations of exchanged transformed signals. The conversers each possess a secret signal and exchange an initial transformation of the secret signal with the other converser. The received transformation of the other converser's secret signal is again transformed with the receiving converser's secret signal to generate a secure cipher key. The transformations use non-secret operations that are easily performed but extremely difficult to invert. It is infeasible for an eavesdropper to invert the initial transformation to obtain either conversers' secret signal, or duplicate the latter transformation to obtain the secure cipher key.

8 Claims, 6 Drawing Figures

CRYPTOGRAPHIC APPARATUS AND METHOD

The Government has rights in this invention pursuant to Grant No. ENG-10173 of the National Science Foundation and IPA No. 0005.

BACKGROUND OF THE INVENTION

1. Field of Invention

The invention relates to cryptographic systems.

2. Description of Prior Art

Cryptographic systems are widely used to ensure the privacy and authenticity of messages communicated over insecure channels. A privacy system prevents the extraction of information by unauthorized parties from messages transmitted over an insecure channel, thus assuring the sender of a message that it is being read only by the intended receiver. An authentication system prevents the unauthorized injection of messages into an insecure channel, assuring the receiver of the message of the legitimacy of its sender.

One of the principal difficulties with existing cryptographic systems is the need for the sender and receiver to exchange a cipher key over a secure channel to which the unauthorized party does not have access. The exchange of a cipher key frequently is done by sending the key in advance over a secure channel such as private courier or registered mail; such secure channels are usually slow and expensive.

Diffie, et al, in "Multiuser Cryptographic Techniques," *AFIPS—Conference Proceedings*, Vol. 45, pp. 109-112, June 8, 1976, propose the concept of a public key cryptosystem that would eliminate the need for a secure channel by making the sender's keying information public. It is also proposed how such a public key cryptosystem could allow an authentication system which generates an unforgeable message dependent digital signature. Diffie presents the idea of using a pair of keys E and D, for enciphering and deciphering a message, such that E is public information while D is kept secret by the intended receiver. Further, although D is determined by E, it is infeasible to compute D from E. Diffie suggests the plausibility of designing such a public key cryptosystem that would allow a user to encipher a message and send it to the intended receiver, but only the intended receiver could decipher it. While suggesting the plausibility of designing such systems, Diffie presents neither proof that public key cryptosystems exist, nor a demonstration system.

Diffie suggests three plausibility arguments for the existence of a public key cryptosystem; a matrix approach, a machine language approach and a logic mapping approach. While the matrix approach can be designed with matrices that require a demonstrably infeasible cryptanalytic time (i.e., computing D from E) using known methods, the matrix approach exhibits a lack of practical utility because of the enormous dimensions of the required matrices. The machine language approach and logic mapping approach are also suggested, but there is not way shown to design them in such a manner that they would require demonstrably infeasible cryptanalytic time.

Diffie also introduces a procedure using the proposed public key cryptosystems, that could allow the receiver to easily verify the authenticity of a message, but which prevents him from generating apparently authenticated messages. Diffie describes a protocol to be followed to obtain authentication with the proposed public key cryptosystem. However, the authentication procedure relies on the existence of a public key cryptosystem which Diffie did not provide.

SUMMARY AND OBJECTS OF THE INVENTION

Accordingly, it is an object of this invention to allow authorized parties to a conversation (conversers) to converse privately even though an unauthorized party (eavesdropper) intercepts all of their communications.

Another object of this invention is to allow conversers on an insecure channel to authenticate each other's identity.

An illustrated embodiment of the present invention describes a method for communicating securely over an insecure channel without prearrangement of a cipher key. A secure cipher key is generated from transformations of exchanged transformed signals, which exchanged transformed signals are easy to effect but difficult to invert. The generated secure cipher key is used to encipher and decipher messages transmitted over the insecure communication channel.

This illustrated embodiment of the present invention describes a method and apparatus for generating a secure cipher key for use with conventional cryptographic communication between conversers over an insecure channel. The illustrated embodiment differs from a public key cryptosystem in that it provides a secure cipher key that is used with a conventional cryptographic system; a public key cryptosystem does not require a conventional cryptographic system. Further, the illustrated embodiment provides a means of transforming a signal that is practical to implement and is demonstrably infeasible to invert using known methods.

In the present invention a first converser transforms, in a manner infeasible to invert, a first signal while a second converser transforms, also in a manner infeasible to invert, a second signal. The first converser transmits the transformed first signal to the second converser, keeping the first signal secret, and the second converser transmits the transformed second signal to the first converser, keeping the second signal secret. The first converser then transforms the first signal with the transformed second signal to generate a third signal, representing a secure cipher key, that is infeasible to generate solely by transforming the transformed first signal and the transformed second signal. And, the second converser transforms the second signal with the transformed first signal to generate a fourth signal, also representing the secure cipher key, that is infeasible to generate solely by transforming the transformed first signal and the transformed second signal.

Another illustrated embodiment of the present invention describes a method for allowing a converser to authenticate another converser's identity. A first converser transforms, in a manner infeasible to invert, a first signal while a second converser transforms, also in a manner infeasible to invert, a second signal. The second converser places the transformed second signal in a public directory as the second converser's means of identification, keeping the second signal secret. The first converser transmits the transformed first signal to the second converser, with whom the first converser desires to communicate, keeping the first signal secret. The first converser then transforms the first signal with the second converser's transformed second signal, obtained from the public directory, to generate a third signal. The third signal represents a secure cipher key to be used for conventional cryptographic communication with the second converser, that is infeasible to generate solely by transforming the transformed first signal and the transformed second signal. The second converser transforms the second signal with the transformed first signal to generate a fourth signal, also representing the secure cipher key, that is infeasible to generate solely by transforming the transformed first signal and the transformed second signal. The second converser's identity is authenticated by the first converser by the second converser's ability to generate the fourth signal, representing the secure cipher key, and to use the secure cipher key in communicating over a conventional cryptographic system.

Additional objects and features of the present invention will appear from the description that follows wherein the preferred embodiments have been set forth in detail in conjunction with the accompanying drawings.

DESCRIPTION OF THE PREFERRED EMBODIMENT

Figure 1:
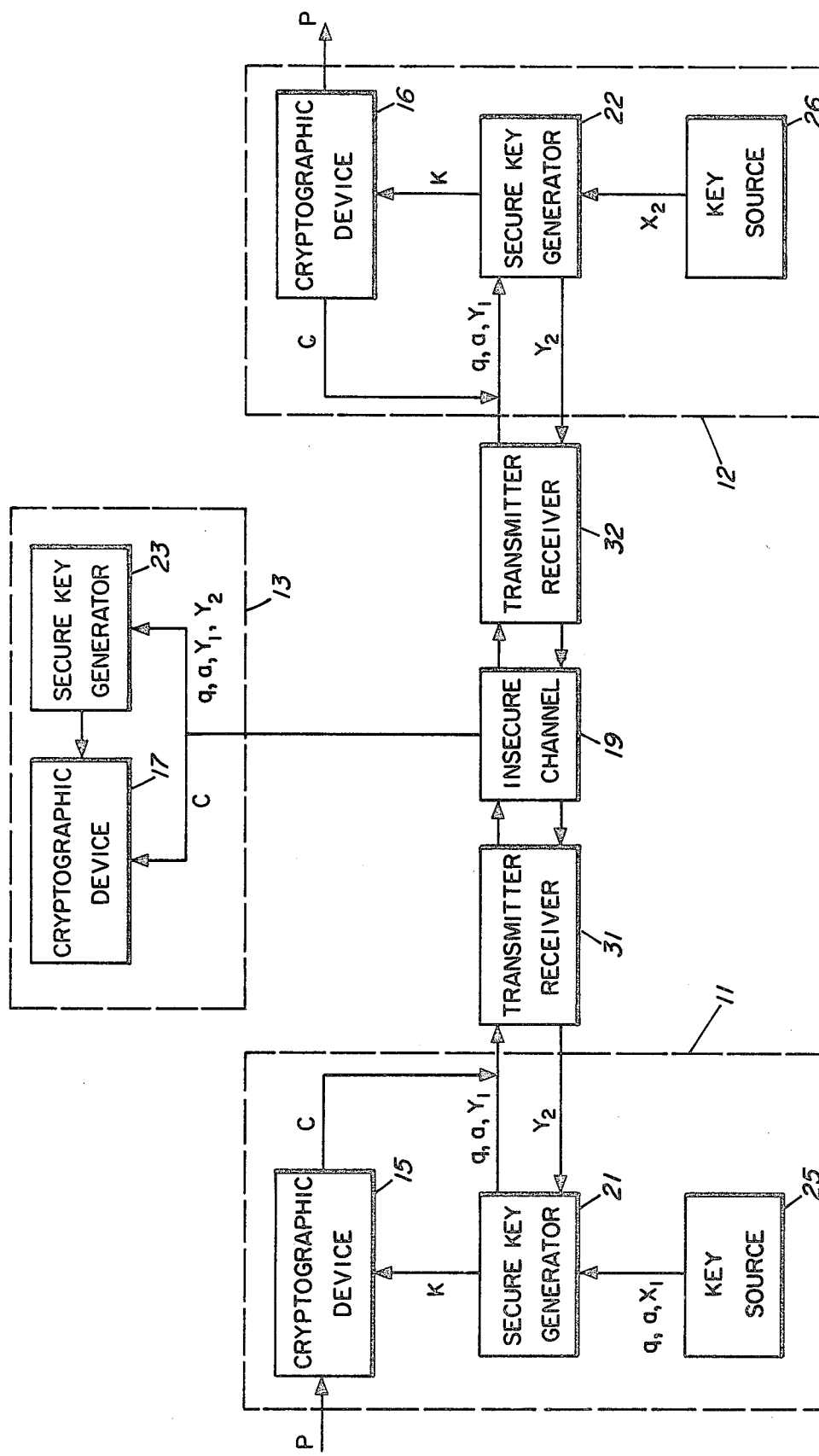
FIG. 1 is a block diagram of a cryptographic system that transmits a computationally secure cryptogram over an insecure communication channel.

Referring to FIG. 1, a cryptographic system is shown in which all communications take place over an insecure communication channel 19, for example a telephone line. Two-way communication is exchanged on the insecure channel 19 between converser 11 and converser 12 using transmitter/receivers 31 and 32, for example modems sch as Bell 210 modems. Converser 11 possesses an unenciphered or plaintext message P to be communicated to converser 12. Converser 11 and converser 12 include cryptographic devices 15 and 16 respectively, for enciphering and deciphering information under the action of a cipher key K on line K. For example, the cryptographic devices 15 and 16 may include the recently adopted National Data Encryption Standard. The cryptographic devices 15 and 16 implement transformations $S_K$ and $S_K^{-1}$ (the transformation which is the inverse of $S_K$) when loaded with key K. For example, key K may be a sequence of random letters or digits. The cryptographic device 15 enciphers the plaintext message P into an enciphered message or ciphertext C on line C that is transmitted by converser 11 through the insecure channel 19; the ciphertext C is received by converser 12 and deciphered by cryptographic device 16 to obtain the plaintext message P. An unauthorized party or eavesdropper 13 is assumed to have a cryptographic device 17 and to have access to the insecure channel 19, so if he knew the key K he could decipher the ciphertext C to obtain the plaintext message P.

Converser 11 and converser 12 include independent key sources 25 and 26 respectively, which generate numbers or signals that represent numbers. For example, the key sources may be random number generators that are implemented from noisy amplifiers (e.g., Fairchild μ709 operational amplifiers) with a polarity detector. Key source 25 generates three signals, q, a, and $X_1$, and key source 26 generates $X_2$; a, $X_1$ and $X_2$ may be signals that represent independent random numbers chosen uniformly from the set of integers (1, 2, . . . q−1). Signals q and a are transmitted to the secure key generator 21 and are transmitted through the insecure channel 19 to secure key generator 22. Signals $X_1$ and $X_2$ are kept secret by converser 11 and converser 12 respectively, are given to the secure key generators 21 and 22 respectively, but are not transmitted through the insecure channel 19.

Converser 11 and converser 12 also include secure key generators 21 and 22 respectively, which accept the signals generated by the respective key sources 25 and 26. Secure key generator 22 also receives the signals q and a which are transmitted through the insecure channel 19. The secure key generators 21 and 22 generate signals $Y_1$ and $Y_2$ respectively by transforming $X_1$ and $X_2$ respectively with signals q and a in a manner that is easily performed but extremely difficult or infeasible to invert. A task is considered infeasible if its cost as measured by either the amount of memory used or the computing time is finite but impossibly large, for example, on the order of approximately $10^{30}$ operations with existing computational methods and equipment such transformations are characterized by the class of mathematical functions known as one-way cipher functions.

Signal $Y_1$ may be generated to represent the number obtained by raising the number represented by signal a to the power represented by signal $X_1$, modulo the number represented by signal q; this transformation may be represented symbolically as $Y_1 = a^{X_1} \bmod q$. Signal $Y_2$ may be generated to represent the number obtained by raising the number represented by signal a to the power represented by signal $X_2$, modulo the number represented by signal q; this transformation may be represented symbolically as $Y_2 = a^{X_2} \bmod q$.

Signals $Y_1$ and $Y_2$ are exchanged by transmitting $Y_1$ and $Y_2$ through the insecure channel 19 to secure key generators 22 and 21 respectively. Secure key generator 21 then generates a secure key K by transforming signal $Y_2$ with signals q, a and $X_1$, and secure key generator 22 generates the same secure key K by transforming $Y_1$ with signals q, a and $X_2$.

Secure key generator 21 may generate a secure key K represented by the number obtained by raising the number represented by signal $Y_2$ to the power represented by signal $X_1$, modulo the number represented by signal q; this transformation may be represented symbolically as $$K = Y_2^{X_1} \bmod q = (a^{X_2})^{X_1} \bmod q = a^{X_1 X_2} \bmod q.$$

Secure key generator 22 may also generate the same secure key K represented by the number obtained by raising the number represented by signal $Y_1$ to the power represented by signal $X_2$, modulo the number represented by signal q; this transformation may be represented symbolically as $$K = Y_1^{X_2} \bmod q = (a^{X_1})^{X_2} \bmod q = a^{X_1 X_2} \bmod q.$$

Converters 11 and 12 then have the same secure key K which may be used with cryptographic devices 15 and 16.

The eavesdropper 13 is assumed to have a secure key generator 23 and to have access to all signals transmitted through the insecure channel 19, including signals q, a, $Y_1$, and $Y_2$. The difficulty of inverting the transformations which generated signals $Y_1$ and $Y_2$ make it infeasible for the eavesdropper 13 to generate signals $X_1$ or $X_2$. Further, the secure key K is infeasible to generate solely with signals q, a, $Y_1$ and $Y_2$.

The eavesdropper 13 is unable to compute the secure key K by multiplication or exponentiation; multiplication yields $$Y_1 Y_2 = a^{X_1 + X_2} \bmod q \neq K$$

and exponentiation yields either $$Y_1^{Y_2} = a^{(X_1 a^{X_1})} \neq K$$

or $$Y_2^{Y_1} = a^{(X_2 a^{X_1})} \neq K.$$

The eavesdropper in theory could obtain $X_1$ or $X_2$ from q, a and $Y_1$ and $Y_2$ by raising a to the first, second, third, etc., powers until $Y_1$ or $Y_2$ was obtained. This is prevented by choosing q to be a large number; if q is a 200 bit quantity, the average number of trials before success is on the order of $2^{198} = 4 \times 10^{59}$ and is physically infeasible. Improved algorithms for computing logarithms modulo q (if $Y = a^X \bmod q$, X is the logarithm of Y to the base a modulo q) are known but, if $q = 2r + 1$ with q and r being prime, then the most efficient known algorithm requires approximately $q^{\frac{1}{2}}$ operations. Again, taking $q = 2^{200}$, about $2^{100} = 10^{30}$ operations are required, still physically infeasible. An example of such a paid is $r = (2^{121} \cdot 5^2 \cdot 7^2 \cdot 11^2 \cdot 13 \cdot 17 \cdot 19 \cdot 23 \cdot 29 \cdot 31 \cdot 37 \cdot 41 \cdot 43 \cdot 47 \cdot 5 \cdot 3 \cdot 59) + 1$ and $q = 2r + 1$. Other restrictions on q, a, $X_1$ and $X_2$ may also be imposed.

Figure 2:
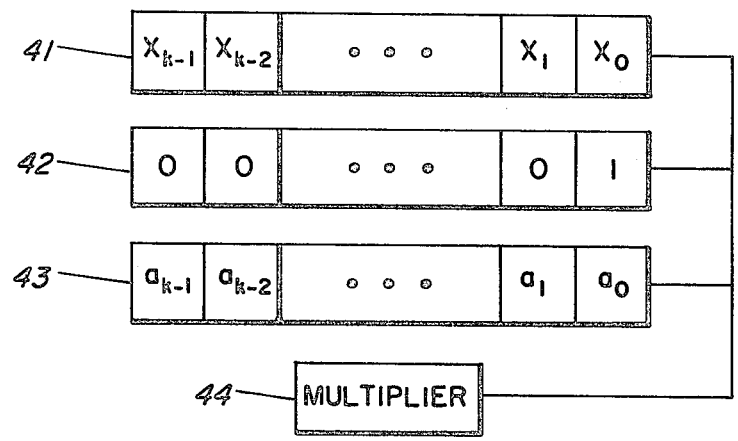
FIG. 2 is a block diagram of a secure key generator for raising various numbers to various powers in modulo arithmetic.

The secure key generators 21 and 22, for raising various numbers to various powers modulo q, can be implemented in electronic circuitry as shown in FIG. 2. For ease of illustration, FIG. 2 depicts raising a to the X power modulo q; raising Y to the X power modulo q is obtained by initially loading Y, instead of a, into the A register 43.

FIG. 2 shows the initial contents of three registers 41, 42 and 43. The binary representation of X ($x_{k-1} x_{k-2} \ldots x_1 x_0$) is loaded into the X register 41; 1 is loaded into the R register 42; and, the binary representation of a is loaded into the A register 43, corresponding to $i = 0$. The number of bits k in each register is the least integer such that $2^k \geq q$. If $k = 200$, then all three registers can be obtained from a single 1024 bit random access memory (RAM) such as the Intel 2102. The implementation of multiplier 44, for multiplying two numbers modulo q, will be described in more detail later.

Referring to FIG. 2, if the low order bit, containing $x_0$, of the X register 41 equals 1 then the R register 42 and the A register 43 contents are multiplied modulo q and their product, also a k bit quantity, replaces the contents of the R register 42. If $x_0 = 0$, the R register 42 contents are left unchanged. In either case, the A register 43 is then loaded twice into the multiplier 44 so that the square, modulo q, of the A register 43 contents is computed. This value, $a^{(2i+1)}$, replaces the contents of the A register 43. The X register 41 contents are shifted one bit to the right and a 0 is shifted in at the left so its contents are now $0 x_{k-1} x_{k-2} \ldots x_2 x_1$.

The low order bit, containing $x_1$, of the X register 41 is examined. If it equals 1 then, as before, the R register 42 and A register 43 contents are multiplied modulo q and their product replaces the contents of the R register 42. If the low order bit equals 0 then the R register 42 contents are left unchanged. In either case, the contents of the A register 43 are replaced by the square, modulo q, of the previous contents. The X register 41 contents are shifted one bit to the right and a 0 is shifted in at the left so its contents are now $00 x_{k-1} x_{k-2} \ldots x_3 x_2$.

This process continues until the X register 41 contains all 0's, at which point the value of $a^X$ modulo q is stored in the R register 42.

An example is helpful in following this process. Taking $q = 23$, we find $k = 5$ from $2^k \geq q$. If $a = 7$ and $X = 18$ then $a^X = 7^{18} = 1,628,413,597,910,449 = 23(70,800,591,213,49-7) + 18$ so $a^X$ modulo q equals 18. This straightforward but laborious method of computing $a^X$ modulo q is used as a check to show that the method of FIG. 2, shown below, yields the correct result. The R register 42 and A register 43 contents are shown in decimal form to facilitate understanding.

| i | X (in binary) | R | A |
|---|---|---|---|
| 0 | 10010 | 1 | 7 |
| 1 | 01001 | 1 | 3 |
| 2 | 00100 | 3 | 9 |
| 3 | 00010 | 3 | 12 |
| 4 | 00001 | 3 | 6 |
| 5 | 00000 | 18 | 13 |

The row marked $i = 0$ corresponds to the initial contents of each register, $X = 18$, $R = 1$ and $A = a = 7$. Then, as described above, because the right most bit of X register 41 is 0, the R register 42 contents are left unchanged, the contents of the A register 43 are replaced by the square, modulo 23, of its previous contents ($7^2 = 49 = 2 \times 23 + 3 = 3$ modulo 23), the contents of the X register 41 are shifted one bit to the right, and the process continues. Only when $i = 1$ and 4 do the right-most bit of the X register 41 contents equal 1, so only going from $i = 1$ to 2 and from $i = 4$ to 5 is the R register 42 replaced by RA modulo q. When $i = 5$, $X = 0$ so the process is complete and the result, 18, is in the R register 42.

Note that the same result, 18, is obtained here as in the straightforward calculation of $7^{18}$ modulo 23, but that here large numbers never resulted.

Another way to understand the process is to note that the A register contains a, $a^2$, $a^4$, $a^8$ and $a^{16}$ when $i = 0$, 1, 2, 3 and 4 respectively, and that $a^{18} = a^{16} a^2$, so only these two values need to be multiplied.

Figure 3:
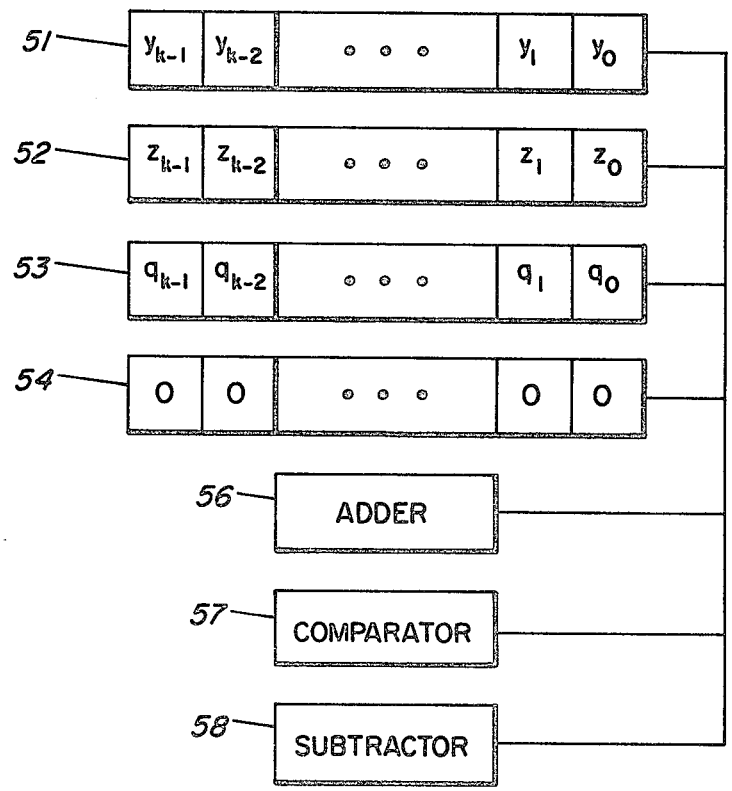
FIG. 3 is a block diagram of a multiplier for performing multiplications in the secure key generator of FIG. 2.

FIG. 3 continues the description of this illustrative implementation by depicting an implementation of the modulo q multiplier 44 in FIG. 2. The two numbers, y and z, to be multiplied are loaded into the Y and Z registers 51 and 52 respectively, and q is loaded in the Q register 53. The product yz modulo q will be produced in the P register 54 which is initially set to 0. If $k = 200$, then all four registers can be obtained from a single 1024 bit RAM such as the Intel 2102. The implementation of FIG. 3 is based on the fact that y z mod $q = y_0 z$ mod $q + 2 y_1 z$ mod $q + 4 y_2 z$ mod $q + \ldots + 2^{k-1} y_{k-1} z$ mod q, where $y_{k-1}y_{k-2}\ldots y_1y_0$ is the binary representation of Y.

To multiply y times z, if the rightmost bit, containing $y_0$, of the Y register 51 is 1 then the contents of the Z register 53 are added to the P register 54 by adder 55. If $y_0=0$, then the P register 54 is unchanged. Then the Q and P register contents are compared by comparator 56 to determine if the contents of the P register 54 are greater than or equal to q, the contents of the Q register 53. If the contents of the P register 54 are greater than or equal to q then subtractor 57 substracts q from the contents of the P register 54 and places the difference in the P register 54, if less than q the P register 54 is unchanged.

Next, the contents of Y register 51 are shifted one bit to the right and a 0 is shifted in at the left so its contents become $0y_{k-1}\,y_{k-2}\ldots y_2y_1$, so that $y_1$ is ready for computing $2y_1z \bmod q$. The quantity $2z \bmod q$ is computed for this purpose by using adder 55 to add z to itself, using comparator 56 to determine if the result, $2z$, is less than q, and using subtractor 57 for subtracting q from $2z$ if the result is not less than q. The result, $2z \bmod q$ is then stored in the Z register 52. The rightmost bit, containing $y_1$, of the Y register 51 is then examined, as before, and the process repeats.

This process is repeated a maximum of k times or until the Y register 51 contains all 0's, at which point xy modulo q is stored in the P register 54.

As an example of these operations, consider the problem of computing $7\times 7$ modulo 23 needed to produce the second state of the A register when $7^{18} \bmod 23$ was computed. The following steps show the successive contents of the Y, Z and P registers which result in the answer $7\times 7=3$ modulo 23.

| i | Y (in binary) | Z  | P              |
|---|---------------|----|----------------|
| 0 | 00111         | 7  | 0              |
| 1 | 00011         | 14 | 0 + 7 = 7      |
| 2 | 00001         | 5  | 7 + 14 = 21    |
| 3 | 00000         | 10 | 21 + 5 = 3 mod 23 |

Figure 4:
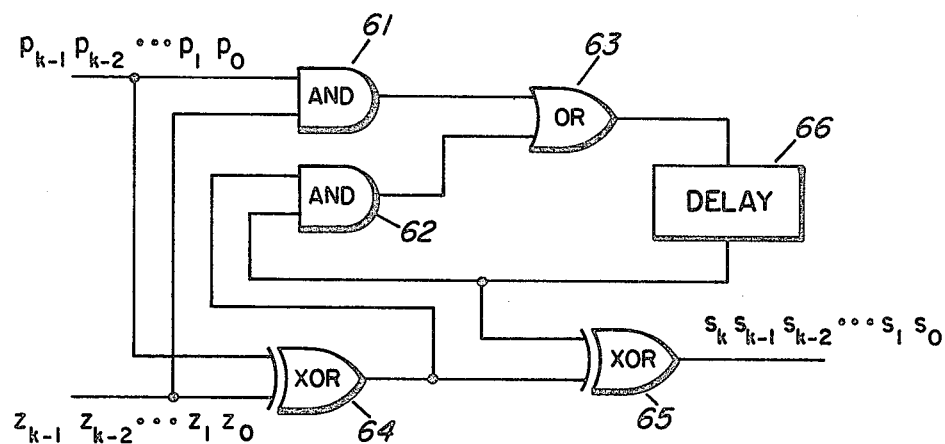
FIG. 4 is a detailed schematic diagram of an adder for performing additions in the multiplier of FIG. 3.

FIG. 4 depicts an implementation of an adder 55 for adding two k bit numbers p and z. The numbers are presented one bit at a time to the device, low order bit first, and the delay element is initially set to 0. (The delay represents the binary carry bit.) The AND gate 61 determines if the carry bit should be a one based on $p_i$ and $z_i$ both being 1 and the AND gate 62 determines if the carry should be a 1 based on the previous carry being a 1 and one of $p_i$ or $z_i$ being 1. If either of these two conditions is met, the OR gate 63 has an output of 1 indicating a carry to the next stage. The two exclusive-or (XOR) gates 64 and 65 determine the $i^{th}$ bit of the sum, $s_i$, as the modulo-2 sum of $p_i$, $z_i$ and the carry bit from the previous stage. The delay 66 stores the previous carry bit. Typical parts for implementing these gates and the delay are SN7400, SN7404, and SN7474.

Figure 5:
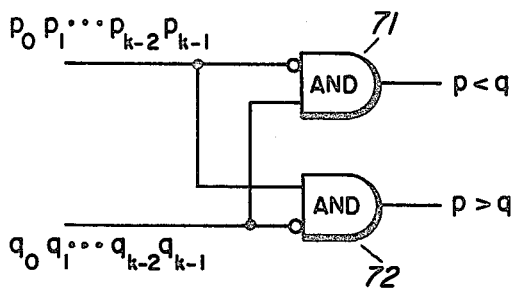
FIG. 5 is a detailed schematic diagram of a comparator for performing magnitude comparisons in the multiplier of FIG. 3.

FIG. 5 depicts an implementation of a comparator 56 for comparing two numbers p and q. The two numbers are presented one bit at a time, high order bit first. If neither the $p<q$ nor the $p>q$ outputs have been triggered after the last bits $p_0$ and $q_0$ have been presented, then $p=q$. The first triggering of either the $p<q$ or the $p>q$ output causes the comparison operation to cease. The two AND gates 71 and 72 each have one input inverted (denoted by a circle at the input). An SN7400 and SN7404 provide all of the needed logic circuits.

Figure 6:
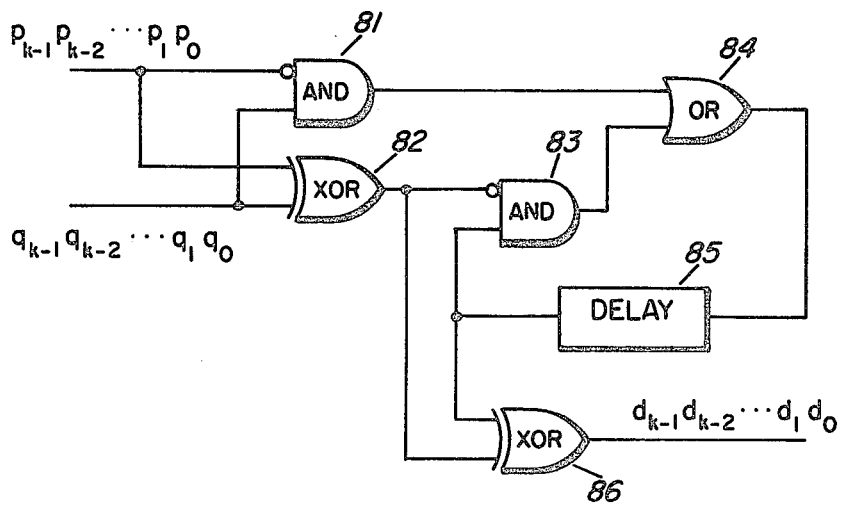
FIG. 6 is a detailed schematic diagram of a subtractor for performing subtractions in the multiplier of FIG. 3.

FIG. 6 depicts an implementation of a subtractor 57 for subtracting two numbers. Because the numbers subtracted in FIG. 3 always produce a non-negative difference, there is no need to worry about negative differences. The larger number, the minuend, is labelled p and the smaller number, the substrahend, is labelled q. Both p and q are presented serially to the subtractor 57, low order bit first. AND gates 81 and 83, OR gate 84 and XOR gate 82 determine if borrowing (negative carrying) is in effect. A borrow occurs if either $p_i=0$ and $q_i=1$, or $p_i=q_i$ and borrowing occurred in the previous stage. The delay 85 stores the previous borrow state. The $i^{th}$ bit of the difference, $d_i$, is computed as the XOR, or modulo-2 difference, of $p_i$, $q_i$ and the borrow bit. The output of XOR gate 82 gives the modulo-2 difference between $p_i$ and $q_i$, and XOR gate 86 takes the modulo-2 difference of this with the previous borrow bit. Typical parts for implementing these gates and the delay are SN7400, SN7404 and SN7474.

There are many methods for implementing this form of the invention. The signals q and a may be public knowledge rather than generated by the key source 25. Further, it should be appreciated that the present invention has the capability of being modified by the use of additional transformations or exchanges of signals.

In some applications, it will prove valuable to have the $i^{th}$ converser on the system generate $Y_i$ as above and place it in a public file or directory rather than transmitting it to another converser with whom he wishes to communicate. Then two conversers i and j who wish to establish a secure channel will use $K_{ij}=Y_i^{X_j} \bmod q = Y_j^{X_i} \bmod q$ as their key. The advantage is that converser i, having once proved his identity to the system through the use of his driver's license, fingerprint, etc., can prove his identity to converser j by his ability to compute $K_{ij}$ and encrypt data with it.

Variations on the above described embodiment are possible. For example, in the above method based on logarithms modulo q, m-dimensional vectors, each of whose components are between 0 and $q-1$ could also be used. Then all operations are performed in the finite field with $q^m$ elements, which operations are well described in the literature. Thus, although the best mode contemplated for carrying out the present invention has been herein shown and described, it will be apparent that modification and variation may be made without departing from what is regarded to be the subject matter of this invention.

What is claimed is:

1. A secure key generator comprising:
   a first input connected to receive an applied first signal;
   a second input connected to receive an applied second signal;
   a first output;
   a second output; and
   means for generating at the first output a third signal, that is a transformation of said first signal and which transformation is infeasible to invert, and for generating at the second output a fourth signal, that is a transformation of said second signal with said first signal, which represents a secure key and is infeasible to generate solely with said second signal and said third signal.

2. In a method of communicating securely over an insecure communication channel of the type which communicates a message from a transmitter to a receiver, the improvement characterized by:

generating and transforming, in a manner infeasible to invert, a first signal at the transmitter to generate a transformed first signal;

generating and transforming, in a manner infeasible to invert, a second signal at the receiver to generate a transformed second signal;

transmitting said transformed first signal from the transmitter to the receiver;

transmitting said transformed second signal from the receiver to the transmitter;

transforming said transformed second signal with said first signal at the transmitter to generate a third signal, representing a secure cipher key, that is infeasible to generate solely with said transformed first signal and said transformed second signal;

transforming said transformed first signal with said second signal at the receiver to generate a fourth signal that is identical to the third signal and represents said secure cipher key;

enciphering the message with said secure cipher key at the transmitter;

transmitting the enciphered message from the transmitter to the receiver; and deciphering the enciphered message with said secure cipher key at the receiver.

3. In a method of communicating securely over an insecure communication channel as in claim 2, further comprising:

authenticating the receiver's identity at the transmitter from the receiver's ability to generate the fourth signal, representing the secure cipher key.

4. A method of generating a secure cipher key between a transmitter and receiver comprising the steps of:

generating and transforming, in a manner infeasible to invert, a first signal at the transmitter to generate a transformed first signal;

generating and transforming, in a manner infeasible to invert, a second signal at the receiver to generate a transformed second signal;

transmitting said transformed first signal from the transmitter to the receiver transmitting said transformed second signal from the receiver to the transmitter;

transforming said transformed second signal with said first signal at the transmitter to generate a third signal, representing a secure cipher key, that is infeasible to generate solely with said transformed first signal and said transformed second signal; and transforming said transformed first signal with said second signal at the receiver to generate a fourth signal that is identical to the third signal and represents said secure cipher key.

5. An apparatus for generating a secure cipher key comprising:

a first secure key generator having a first input connected to receive an applied first signal, having a second input connected to receive a second signal, having a first and second outputs, and having a means for generating at the first output a third signal, that is a transformation of said first signal and which transformation is infeasible to invert, and for generating at the second output a fourth signal, that is a transformation of said second signal with said first signal, which represents a secure key and is infeasible to generate solely with said second signal and said third signal; and a second secure key generator having a first input connected to receive an applied fifth signal, having a second input connected to receive said third signal, having a first and second outputs, and having a means for generating at the first output said second signal, that is a transformation of said fifth signal and which transformation is infeasible to invert, and for generating at the second output a sixth signal, that is a transformation of said third signal with said fifth signal, which represents the secure key and is infeasible to generate solely with said second signal and said third signal.

6. A method of generating a secure cipher key between a transmitter and receiver comprising the steps of:

transforming, in a manner infeasible to invert, a first signal at the transmitter to generate a transformed first signal wherein transforming said first signal is performed by raising a first number to a power represented by said first signal, modulo a second number;

transforming, in a manner infeasible to invert, a second signal at the receiver to generate a transformed second signal, wherein transforming said second signal is performed by raising the first number to a power represented by said second signal, modulo the second number;

transmitting said transformed first signal from the transmitter to the receiver;

transmitting said transformed second signal from the receiver to the transmitter;

transforming said transformed second signal with said first signal at the transmitter to generate a third signal, representing a secure cipher key, that is infeasible to generate solely with said transformed first signal and said transformed second signal, wherein transforming said transformed second signal with said first signal is performed by raising a number represented by said transformed second signal to a power represented by said first signal, modulo the second number; and transforming said transformed first signal with said second signal at the receiver to generate a fourth signal, representing said secure cipher key, that is infeasible to generate solely with said transformed first signal and said transformed second signal, wherein transforming said transformed first signal with said second signal is performed by raising a number represented by said transformed first signal to a power represented by said second signal, modulo the second number.

7. An apparatus for generating a secure cipher key comprising:

a first secure key generator having a first input connected to receive an applied first signal, having a second input connected to receive a second signal, having first and second outputs, and having a means for generating at the first output a third signal, that is a transformation of said first signal in which said transformation includes raising a first number to a power represented by said first signal, modulo or second number, and for generating at the second output a fourth signal, that is a transformation of said second signal with said first signal which transformation includes raising a number represented by said second signal to a power represented by said first signal, modulo the second number, which represents a secure key and is infeasible to generate solely with said second signal and said third signal; and a second secure key generator having a first input connected to receive an applied fifth signal, having a second input connected to receive said third signal, having a first and second outputs, and having a means for generating at the first output said second signal, that is a transformation of said fifth signal in which said transformation includes raising a first number to a power represented by said fifth signal, modulo the second number, and for generating at the second output a sixth signal, that is a transformation of a said third signal with said fifth signal which transformation includes raising a number represented by said third signal to a power represented by said fifth signal, modulo the second number, which represents the secure key and is infeasible to generate solely with said second signal and said third signal.

8. An apparatus for generating a secure cipher key comprising:

a first secure key generator having a first input connected to receive an applied first signal, having a second input connected to receive a second signal, having a first and second outputs, and having a means for generating at the first output a third signal, said third signal $Y_i$ being described by $$Y_i = a^{x_i} \bmod q$$

where
q = a large prime number
a = a random number, such that $1 \leq a \leq q-1$
$x_i$ = the first signal which represents a random number, such that $1 \leq X_i \leq q-1$ a transformation of said first signal which is infeasible to invert, and for generating at the second output a fourth signal, said fourth signal $K_{ij}$ being described by $$K_{ij} = Y_j^{X_i} \bmod q$$

where
$Y_j$ = the second signal a transformation of said second signal with said first signal, which represents said secure cipher key and is infeasible to generate solely with said second signal and said third signal; and a second secure key generator having a first input connected to receive an applied fifth signal, having a second input connected to receive said third signal, having a first and second outputs, and having a means for generating at the first output a second signal, said second signal $Y_j$ being described by $$Y_j = a^{X_j} \bmod q$$

where
$X_j$ = the fifth signal which represents a random number, such that $1 \leq X_j \leq q-1$ a transformation of said fifth signal which is infeasible to invert, and for generating at the second output a sixth signal, said sixth signal $K_{ij}$ being described by $$K_{ij} = Y_i^{X_j} \bmod q$$

a transformation of said third signal with said fifth signal, which represents the secure key and is infeasible to generate solely with said second signal and said third signal.

* * * * *